United States Patent
Cowan et al.

(10) Patent No.: US 6,789,581 B2
(45) Date of Patent: Sep. 14, 2004

(54) APPARATUS FOR SEALING, INFLATING, AND REPAIRING TIRES

(75) Inventors: David Cowan, Brooklyn, NY (US); Jochen Schäpers, New York, NY (US); Saul Trachtenberg, Brooklyn, NY (US)

(73) Assignee: Interdynamics, Inc., Brooklyn, NY (US)

( * ) Notice: Subject to any disclaimer, the term of this patent is extended or adjusted under 35 U.S.C. 154(b) by 0 days.

(21) Appl. No.: 10/285,192

(22) Filed: Oct. 31, 2002

(65) Prior Publication Data

US 2004/0159365 A1 Aug. 19, 2004

(51) Int. Cl.$^7$ ................................................. B65B 1/04
(52) U.S. Cl. ......................... 141/38; 141/67; 141/100; 152/415
(58) Field of Search ............................. 141/38, 65, 67, 141/286, 9, 100; 152/415; 156/75; 222/630, 637

(56) References Cited

U.S. PATENT DOCUMENTS

| | | |
|---|---|---|
| 2,812,783 A | 11/1957 | Bufogle |
| 3,729,033 A | 4/1973 | Bayerkohler |
| 4,101,494 A | 7/1978 | Kent et al. |
| 4,137,206 A | 1/1979 | Kent |
| 4,224,208 A | 9/1980 | Kent |
| 4,276,898 A | 7/1981 | Ross |
| 4,308,766 A | 1/1982 | Myers, Jr. |
| 4,337,322 A | 6/1982 | Jaspon |
| 4,426,468 A | 1/1984 | Ornum et al. |
| 4,501,825 A | 2/1985 | Magyar et al. |
| 4,528,331 A | 7/1985 | Böhm et al. |
| 4,713,114 A | 12/1987 | Smith |
| 4,765,367 A * | 8/1988 | Scott .......................... 137/607 |
| 4,798,233 A | 1/1989 | Mooney |
| 4,970,242 A | 11/1990 | Lehman |
| 5,070,917 A | 12/1991 | Ferris et al. |
| 5,124,395 A | 6/1992 | Abramowski et al. |
| 5,251,787 A | 10/1993 | Simson |
| 5,338,776 A | 8/1994 | Peelor et al. |
| 5,364,463 A | 11/1994 | Hull |
| 5,386,857 A | 2/1995 | Fogal, Sr. et al. |
| 5,403,417 A | 4/1995 | Dudley et al. |
| 5,472,023 A | 12/1995 | Fogal, Sr. et al. |
| 5,500,456 A | 3/1996 | Hughett et al. |
| 5,618,912 A | 4/1997 | Fang |
| 5,648,406 A | 7/1997 | Peelor et al. |
| 5,705,604 A | 1/1998 | Fang |
| 5,765,601 A | 6/1998 | Wells et al. |
| 5,908,145 A | 6/1999 | Jaksa |
| 5,916,931 A | 6/1999 | Adams et al. |
| 5,977,196 A | 11/1999 | Wicks |
| 5,992,476 A | 11/1999 | Sowry |
| 6,013,697 A | 1/2000 | True et al. |
| 6,019,145 A * | 2/2000 | Savidge ........................ 141/38 |
| 6,092,569 A | 7/2000 | Simmel et al. |
| 6,283,172 B1 * | 9/2001 | Thurner ........................ 141/38 |
| 6,345,650 B1 | 2/2002 | Paasch et al. |
| 6,412,524 B1 | 7/2002 | Fogal, Sr. |
| 2002/0112777 A1 | 8/2002 | Fang et al. |

* cited by examiner

*Primary Examiner*—Steven O. Douglas
(74) *Attorney, Agent, or Firm*—Levisohn, Berger & Langsam, LLP; Barry E. Nyrin (57) ABSTRACT

A tire repair device is provided. A receptacle/port is in communication with the air flow path; the receptacle/port is adapted to sealingly receive a container of tire sealant. When the air compressor is activated and a container of tire sealant is received in or secured to the receptacle or port, air from the air compressor is forced into the container and pushes tire sealant out of the container, into and out of the receptacle, into the air flow path, and into a tire. Preferably, the receptacle includes a piercing projection disposed in the receptacle adapted to pierce a seal on a container of tire sealant secured in the receptacle. Preferably, the intake and the exhaust are configured in the receptacle so that both the intake and the exhaust are opposite substantially the same opening of a container of tire sealant received in or secured to in the receptacle.

47 Claims, 13 Drawing Sheets

FIG. 14A

APPARATUS FOR SEALING, INFLATING, AND REPAIRING TIRES

BACKGROUND OF THE INVENTION

1. Field of the Invention

The invention relates to the field of do-it-yourself automotive repair, and more specifically to devices for sealing and inflating automobile (and similar) tires that may have a leak.

2. Description of the Related Art

Automobiles, trucks, sport utility vehicles, and the like typically ride on toroidal rubber tires filled with compressed air. Sometimes, the integrity of a tire can become compromised, either through the age of the tire, a sharp road hazard, or for other reasons. If the tire cannot effectively contain compressed air, it becomes flat and cannot be used. Getting a flat tire can be a major inconvenience or even dangerous, especially if the tire goes flat on a highway or a significant distance away from a service station.

Some effort has been made to provide a portable tire repair kit that can fit in the trunk of an automobile or the cab of a truck and be usable by an ordinary motorist to repair a flat tire. For example, U.S. Pat. No. 6,283,172 to Thumer describes a tire repair device having a replaceable bottle containing tire sealant and a self-contained air compressor. The bottle is placed inside the pressurized container, and the compressor is turned on. As the pressure in the pressurized container builds up, because the bottle is flexible, it is compressed, thereby squeezing the sealant from it into the tire. This device is unwieldy and not readily workable because significant pressure is required to squeeze the bottle sufficiently to expel the tire sealant. Moreover, once a tire is inflated, the device needs to be resealed with a new cover at a garage or service station. Also, the device cannot be used as a simple air compressor without a bottle being present.

U.S. Pat. No. 6,345,650 to Paasch et al. teaches a tire repair device having a refillable bottle containing tire sealant having an inlet valve on top and an outlet valve on the bottom. One connects the inlet valve to an external source of compressed air such as a fully inflated tire on the vehicle, and the compressed air expels the tire sealant from the bottle and into the flat tire. This device has several drawbacks. First, it is dangerous to lower the air pressure in the non-flat tires for the sake of inflating the flat tire; tires with lowered air pressure are more susceptible to rupture. Second, if more than one tire is flat, the remaining non-flat tires may be insufficient to inflate the flat tires. Third, once the motorist uses the device, it must be refilled with tire sealant. Also, the Paasch device does not have its own source of compressed air.

U.S. Pat. No. 6,412,524 to Fogal, Sr. discloses a device attachable to a source of pressurized air such as a conventional air compressor. Air is injected into the bottom end via an elbow and out of the top end via a fitting. The air flow path is non-aligned to create cyclonic movement in the chamber. The container is refillable and integral with device, and one must remove the core of the tire valve in order to attach the fitting to the tire.

In all of the above references, the devices disclosed must either be repaired after each use or refilled, an annoying and inconvenient drawback, particularly if more than one tire must be inflated at a given time. Most do not offer a built-in source of compressed air, and not one offers a device in which an integral compressed air source can be used if no tire sealant container is present. That is, the devices described above cannot be used safely as simple air compressors if the need arises. Also, tire sealant, by its very nature, coagulates and hardens into an airtight substance. Yet none of the devices described above address the concern that liquid tire sealant remaining in the dispensing port of the device will harden and form a plug that will prevent the device from being used again.

There is a long-felt need in the art to provide a tire sealing and inflating device that an ordinary motorist can use quickly, easily, and efficiently that does not suffer from the above drawbacks.

SUMMARY OF THE INVENTION

Accordingly, it is an object of the invention to provide a tire repair device that will allow an ordinary motorist to be able to repair and inflate a flat tire while the tire is still on the wheel of a vehicle.

It is another object of the invention to provide a tire repair device that can be reused repeatedly.

It is still another object of the invention to provide a tire repair device that can be reused repeatedly without fear of having the air line blocked by hardened tire sealant.

It is another object of the invention to provide a tire repair device that can be reused repeatedly and recharged with tire sealant easily.

Still a further object of the invention is to provide a tire repair device that can be used as a conventional air compressor when it is not needed to repair a tire.

The above and other objects are fulfilled by the invention, which is a tire repair device having a housing, an air compressor disposed within the housing, and an air flow path from the air compressor adapted to be connected to a tire. A receptacle and/or port is formed in the housing in communication with the air flow path; the receptacle or port is adapted to sealingly receive a container of tire sealant. When the air compressor is activated and a container of tire sealant is secured to/received in the receptacle/port, air from the air compressor is forced into the container and pushes tire sealant out of the container, into the receptacle, into the air flow path and into a tire. Preferably, the receptacle includes an intake that receives air from the air flow path upstream of the receptacle and an exhaust that returns air to the air flow path downstream of the receptacle. When a container of tire sealant is received in the receptacle, the intake directs air from the air flow path substantially into the container, and the exhaust receives air and tire sealant from the container and directs the air and tire sealant into the air flow path. Preferably, the receptacle includes a piercing projection disposed in the receptacle adapted to pierce a seal on a container of tire sealant that is receivable in the receptacle. Preferably, the intake and the exhaust are configured in the receptacle so that both the intake and the exhaust are opposite substantially the same opening of a container of tire sealant received/secured in the receptacle. In one embodiment, a check valve may be disposed on the intake to prevent air and tire sealant form entering the intake.

The air flow path preferably terminates in a hose which terminates in a chuck adapted to sealingly engage a conventional tire valve. A chuck holder is disposed on an exterior of the housing having a substantially annular depression and a central projection shaped to fit inside the chuck when the chuck is in a storage configuration and not in use. That is, the chuck is placed on the chuck holder, and the central projection enters the chuck to prevent a glob of tire sealant from hardening and clogging the chuck.

The invention also includes an unpressurized container of tire sealant for use with the above-described tire repair device. The container includes a plastic container housing, sufficient tire sealant within the container housing to repair a flat conventional automobile tire, an opening in the housing, and a membranous seal covering the opening. When the container is secured to the receptacle of the tire repair device, the container's opening substantially opposes the intake and the exhaust. When the container is placed in the receptacle, the piercing projection pierces the membranous seal on the container to allow air from the intake to enter the opening and air and the tire sealant to exit the opening and enter the exhaust. The container is preferably disposable.

When no container is in the device's receptacle, the device functions like a conventional air compressor and can inflate tires. Because the air pressure of a conventional air compressor can be quite high, and because it is not cost effective to use containers that have a burst pressure in excess of the conventional compressor air pressure, a pressure relief valve is disposed in the air flow path to limit the air pressure to a predetermined level in the device when the air compressor is operating. That predetermined pressure level is below a burst pressure of a container of tire sealant to be used with the device. Accordingly, the disposable containers to be used with the device need not be expensive yet will not explode or rupture during use. By the same token, when one is using the device as a conventional air compressor, one would like to be able to achieve the maximum pressure available by the compressor. To wit, a pressure relief override switch is mechanically engageable with the pressure relief valve; operation of the pressure relief override switch disables the pressure relief valve and allows the air pressure to exceed the predetermined level.

Alternate embodiments are also contemplated. Specifically, the invention also includes the container-receiving port mentioned above in a form in which the port is separate from the air compressor and has an intake that receives air from a separate air compressor upstream of the port and an exhaust downstream of the port. The port may be a separate attachment that can be secured to a container of tire sealant, or it may be integral with a disposable container of tire sealant. As another alternative, an aerosol or pressurized container may be employed in which the contents of the container are pressurized and actively expelled from the container rather than being forced out by air from the air compressor. The pressurized container may have an activation switch for selectively allowing the tire sealant to be expelled, so that when the air compressor and the activation switch are activated, the tire sealant is expelled from the pressurized container and is entrained along with the air from the air compressor.

DETAILED DESCRIPTION OF THE PREFERRED EMBODIMENTS AND DRAWINGS

The invention will now be described with reference to FIGS. 1–14 appended hereto. It should be noted that these drawings are exemplary in nature and in no way serve to limit the scope of the invention, which is defined by the claims appearing hereinbelow.

Figure 1:
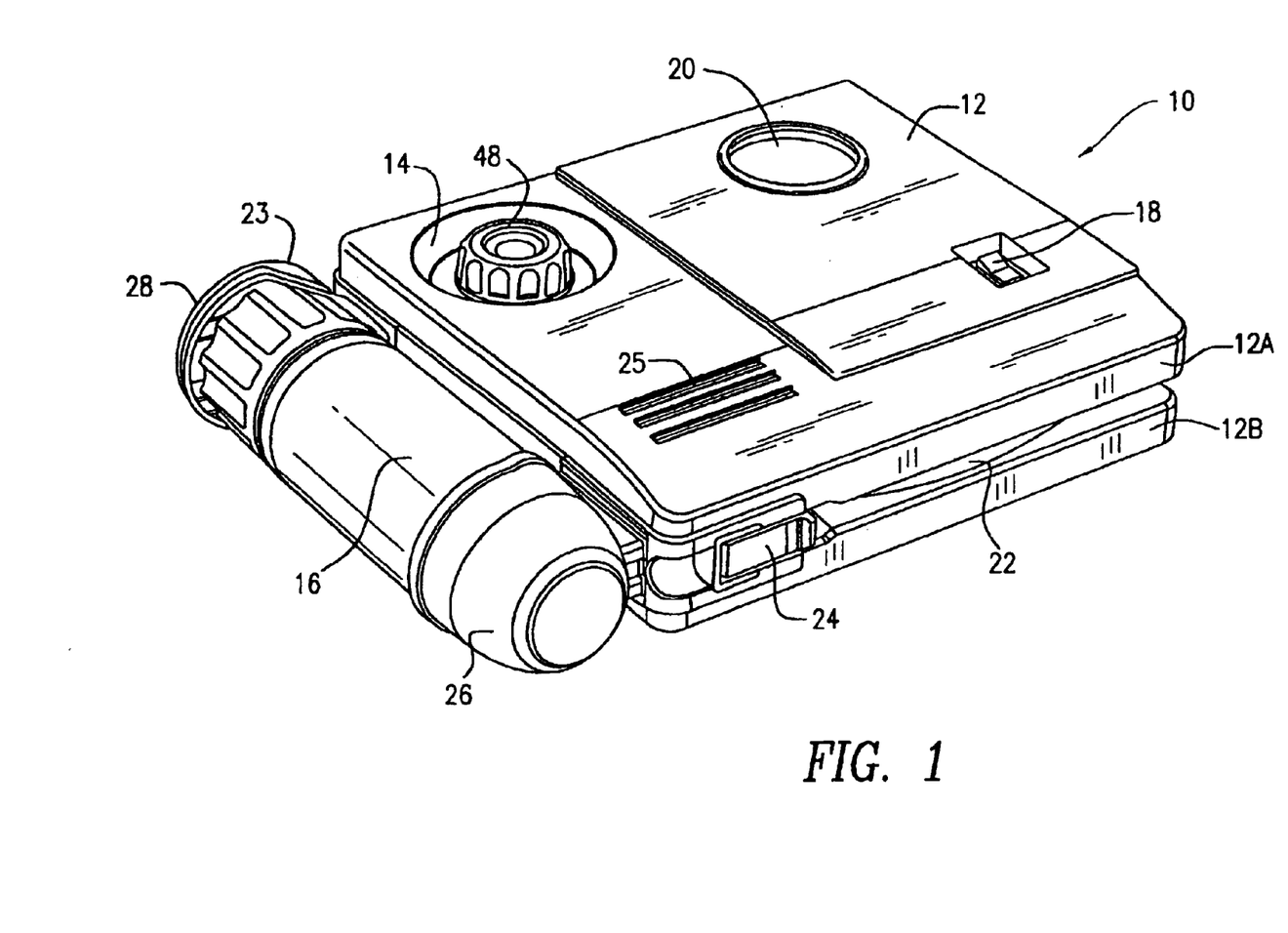
FIG. 1 is a perspective view of a tire repair device in accordance with the invention.
Figure 2:
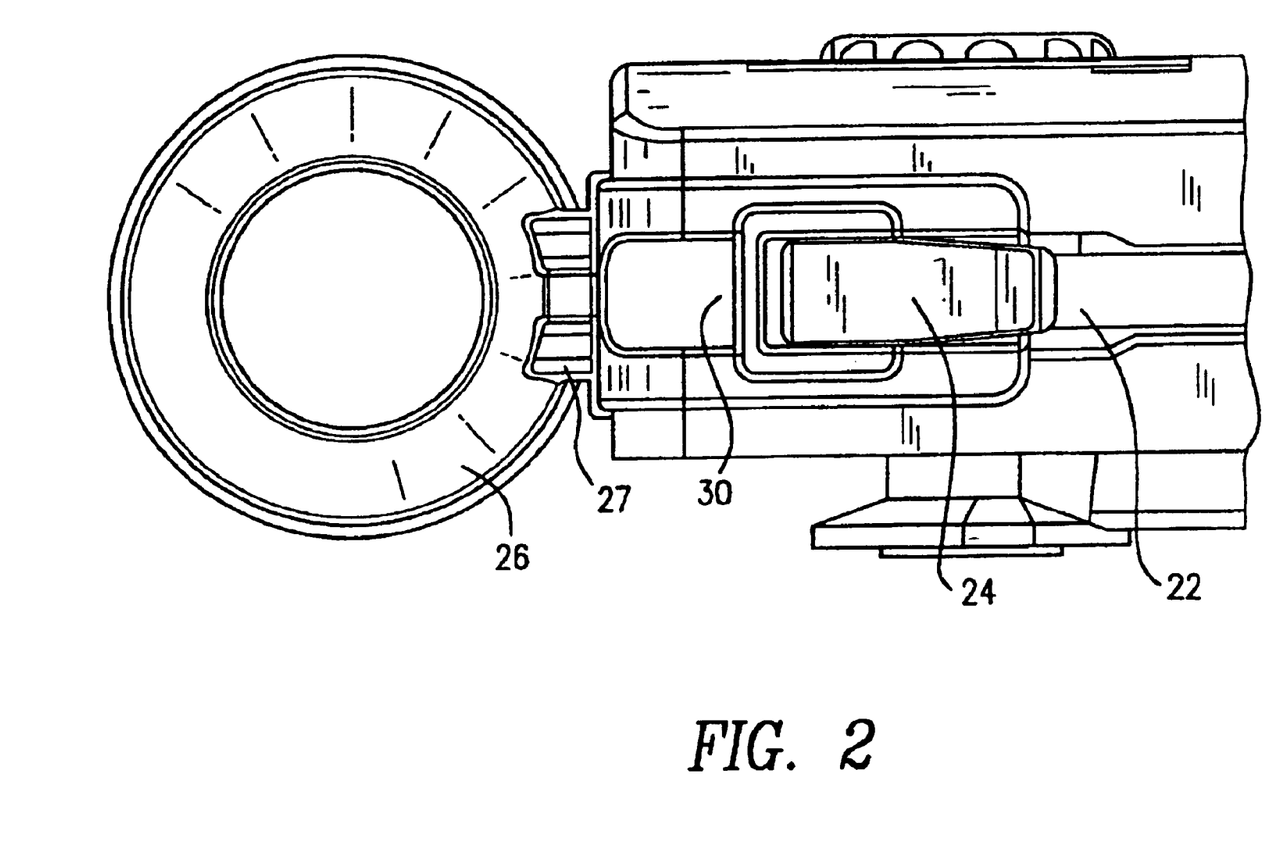
FIG. 2 is a partial front elevation view of the tire repair device of FIG. 1.
Figure 3:
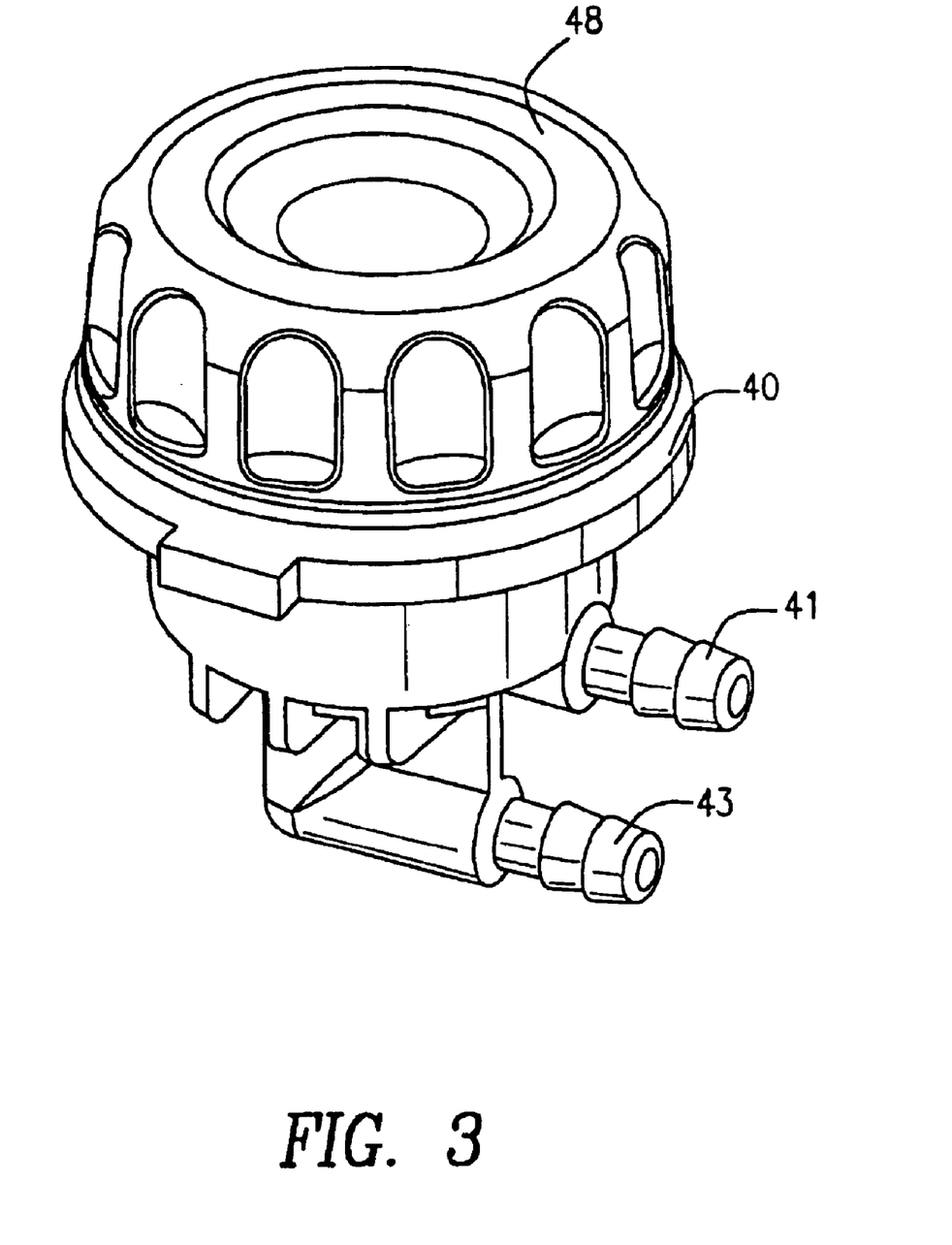
FIG. 3 is a perspective view of a receptacle port for a tire device in accordance with the invention.
Figure 4:
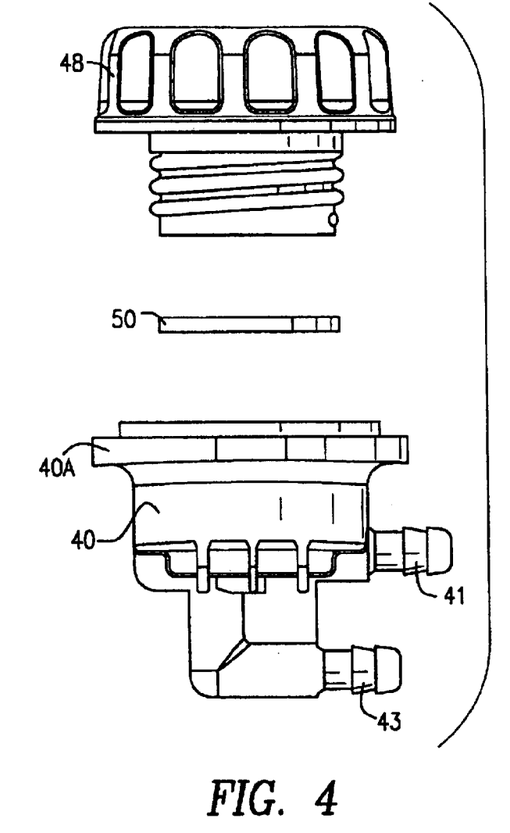
FIG. 4 is an exploded side view of the receptacle port of FIG. 3.
Figure 5:
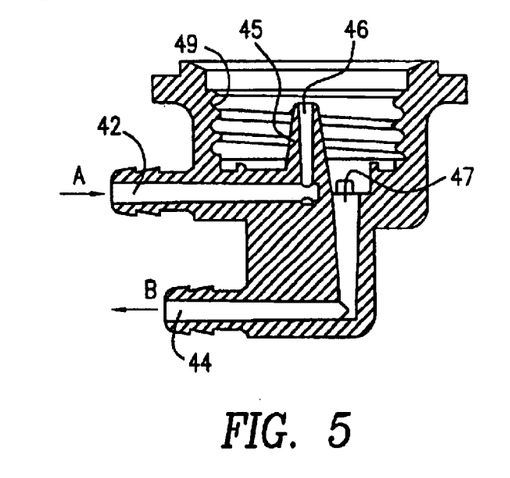
FIG. 5 is a sectional view of the receptacle port of FIG. 3.
Figure 6:
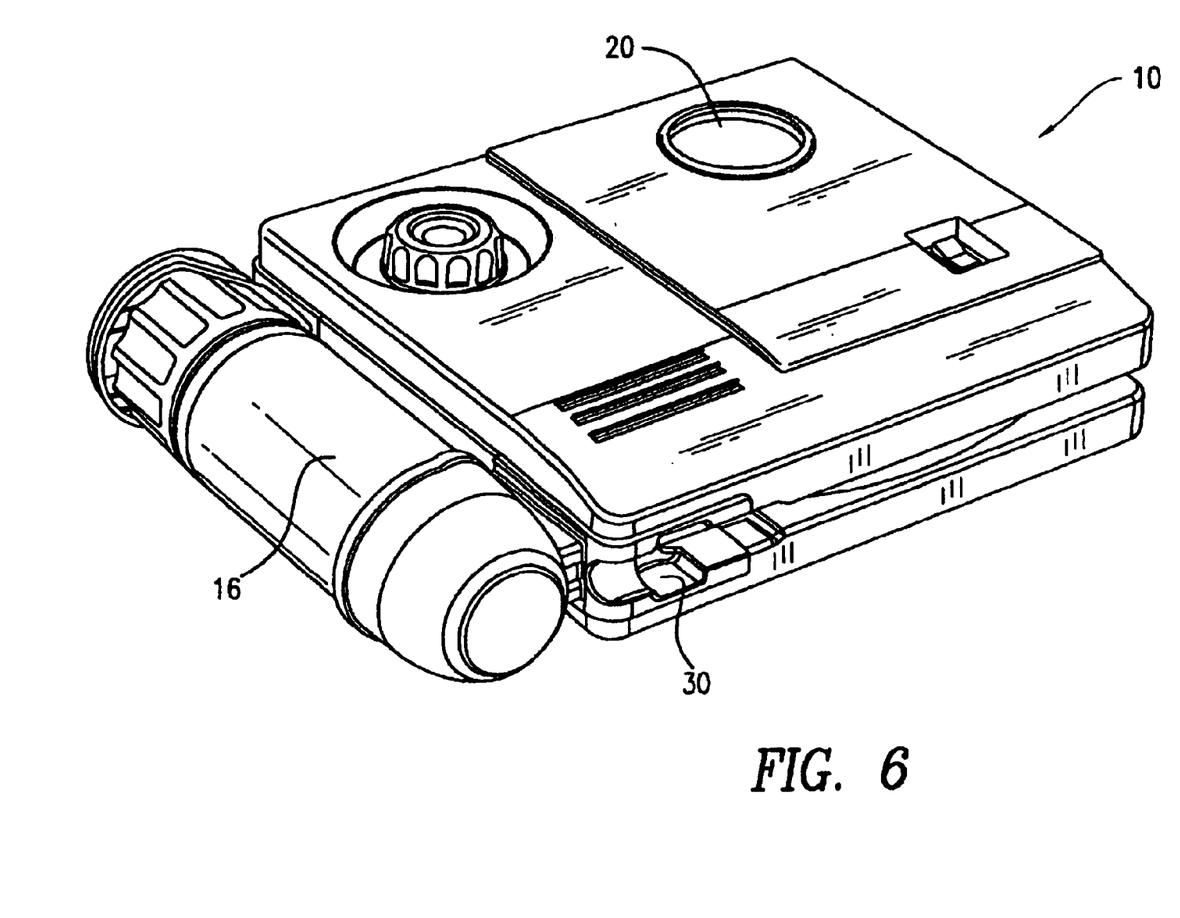
FIG. 6 is a perspective view of a tire repair device in accordance with the invention with the air hose removed to show the chuck holder.
Figure 7:
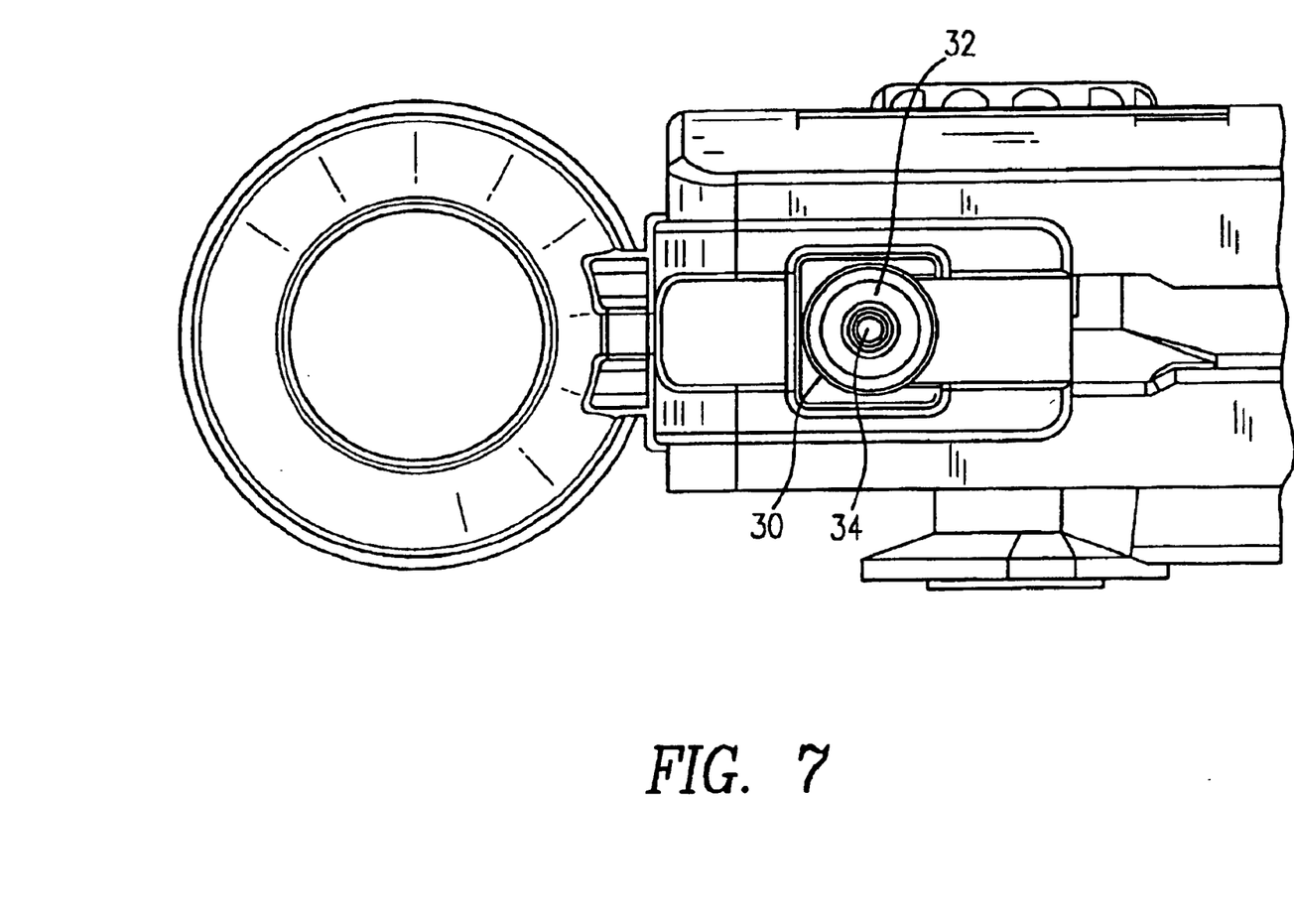
FIG. 7 is a partial front elevation view of a tire repair device in accordance with the invention with the air hose removed to show the chuck holder.
Figure 8:
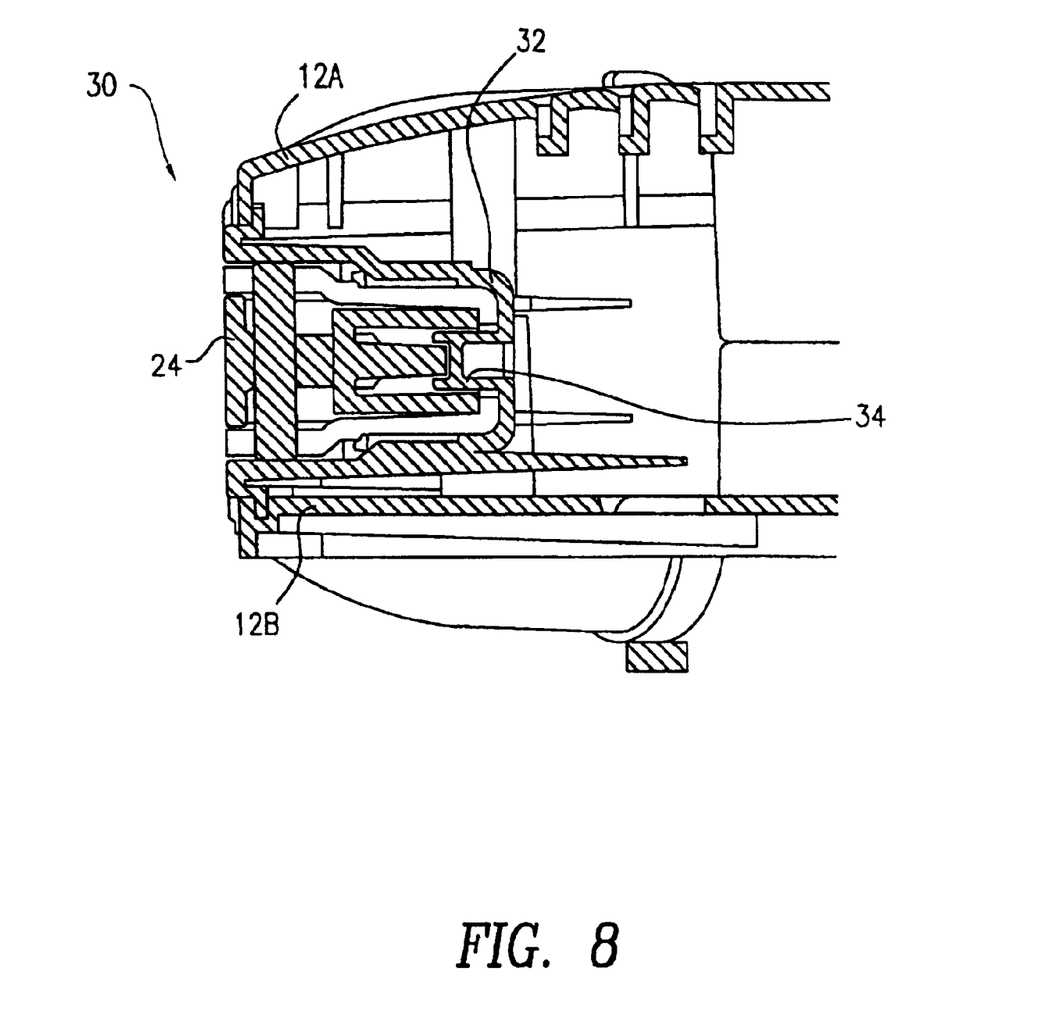
FIG. 8 is a sectional view of the chuck holder of FIGS. 6 and 7.
Figure 9:
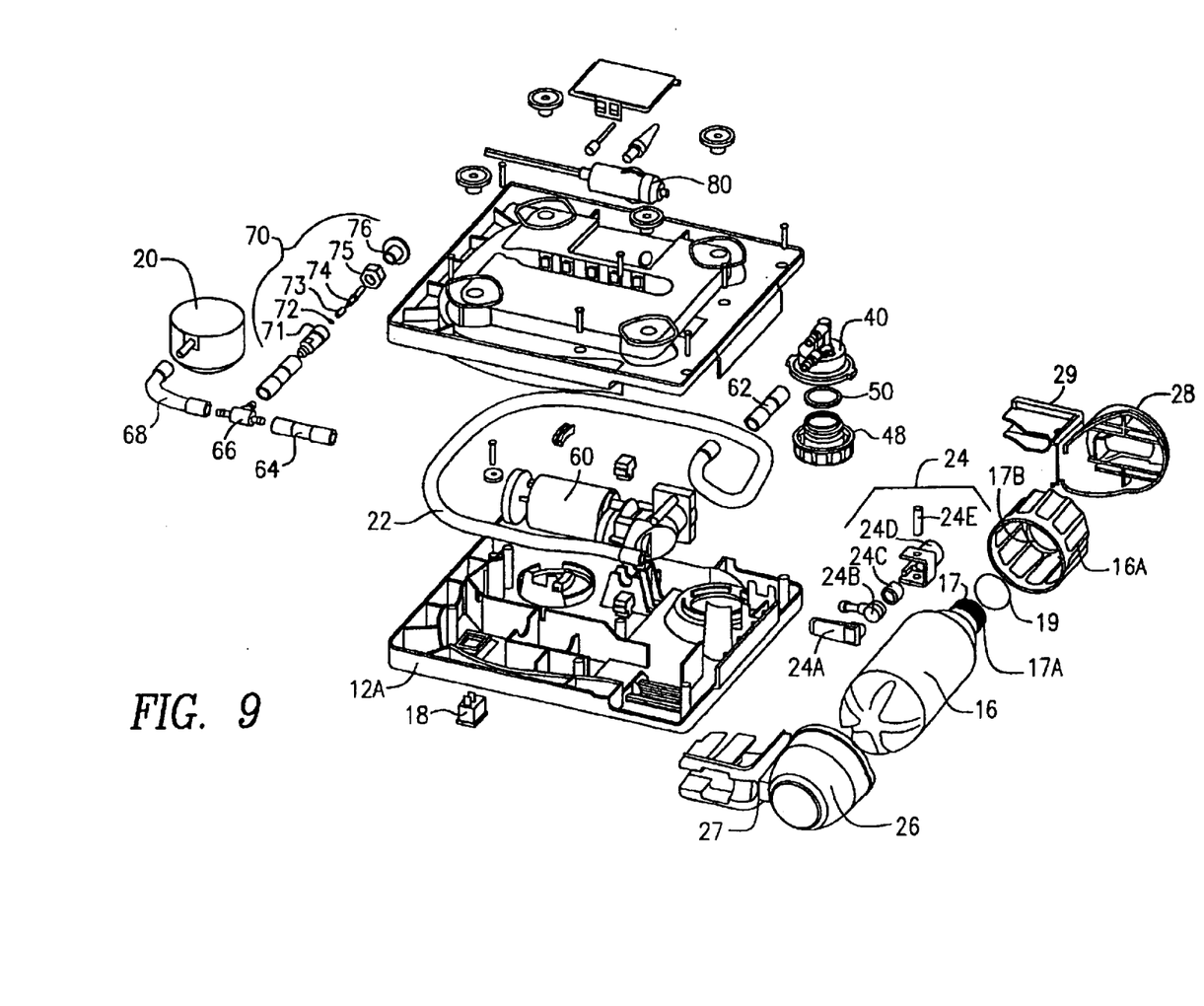
FIG. 9 is an exploded perspective view of a tire repair device in accordance with the invention.

As shown in perspective in FIG. 1, the inventive tire repair device 10 has some features of a conventional portable air compressor in addition to many new features which enable device 10 not only to inflate a flat tire but also to repair a leak in a flat tire at substantially the same time. The device 10 has a housing 12 which may be made from upper and lower halves 12A and 12B. Alternatively, the housing may be constructed from any convenient number of pieces. A receptacle 14 is formed in the housing 12 for receiving an unpressurized bottle 16 of tire sealant in a manner to be described below. Housing 12 may include a bottle clamp 23 having brackets 26 and 28 projecting from flanges 27 and 29 for securing a bottle 16 to the side of device 10. The device may optionally be provided with an on-off switch 18 and a pressure gauge 20. Air hose 22 is connected to the air compressor 60 (see FIG. 9) inside housing 12, and the free end of hose 22 terminates in a chuck 24 suitable for attaching to a tire valve. As shown in FIG. 9, chuck 24 includes typical components such as lever 24A, core depressor 24B, collet 24C, body 24D, and pin 24E. Device 10 may also be provided with air vents 25 to allow the air compressor an intake source of air. The device may be connectable to and powered by an automobile cigarette lighter via adapter 80 (see FIG. 9).

Housing 12 includes a chuck holder 30 for storing chuck 24 when device 10 is not in use. With reference to FIGS. 2 and 6–8, chuck holder 30 includes an annular depression or well 32 shaped to receive the annular body 24D of chuck 24. Disposed substantially centrally within well 32 is projection 34 which is shaped to project into body 24D when chuck 24 is fitted into holder 30. Well 32 helps keep chuck 24 around projection 34, and projection 34 prevents a glob of tire sealant residue from remaining in and hardening within (and thus partially or totally blocking) chuck body 24D.

As mentioned above, housing 12 includes receptacle 14 into which bottle 16 may be disposed in order to provide tire sealant to the system. Sealant receiving port 40, best illustrated in FIGS. 3–5 and 9, is disposed in receptacle 14 for the purposes of injecting air from air compressor 60 into bottle 16 when the bottle is disposed in receptacle 14 and for accepting tire sealant forced out of the bottle by way of the high pressure compressed air injected therein. Flange 40A preferably helps seat port 40 within receptacle 14; other known means of securing the port within the receptacle are also contemplated. Port 40 includes an intake nozzle 41 connected to air compressor 60 (see FIG. 9); internal bore 42 forms an intake air flow path through nozzle 41 which passes through central projection 45 and terminates in intake hole 46. Air coming into nozzle 41 travels in the direction of arrow A of FIG. 5 from air compressor 60 via hose 62. Port 40 also includes an exhaust nozzle 43 connected to hose 22 and chuck 24 (see FIG. 9); internal bore 44 forms an exhaust air flow path which terminates in exhaust hole 47. Air (and sometimes tire sealant) exiting from nozzle 43 travels in the direction of arrow B of FIG. 5 and into hose 22 and thence chuck 24. When the bottle is not being used and the device 10 must function like a conventional air compressor, cap 48 is screwed into threads 49 of port 40 and sealed with gasket 50 so that compressed air will not leak out of port 40.

Additional details of bottle 16 are provided in FIG. 9. Bottle 16 is preferably provided with a single opening 17 which is sealed with a thin membranous covering or seal 19 of at least one of paper, foil, rubber, plastic, or the like. The neck of the bottle is provided with threads 17A which are adapted to matingly engage threads 49 of port 40. A cap 16A is also preferably provided having internal threads 17B also matingly engageable with threads 17A of bottle 16. A snap-on cap (not shown) or other known or to-be-designed types of caps may also be employed.

When it is desired to install a bottle of tire sealant into receptacle 14, cap 16A is removed from bottle 16. Threads 17A of bottle 16 are aligned with threads 49 of port 40, and the bottle is screwed into place. As the bottle moves deeper into port 40, seal 19 comes closer and closer to projection 45 until projection 45 ultimately pierces seal 19. If air compressor 60 is not on, seal 19 can still maintain closure of opening 17 of bottle 16 around projection 45. When air compressor 60 is activated, air is forced into port 40 via nozzle 41 and up through bore 42, exiting via intake hole 46 in projection 45. Since intake hole 46 is, at this point, within bottle 16, air is injected into bottle 16. As air enters the bottle, punctured seal 19 bows and ruptures allowing tire sealant and air to be expelled from bottle 16. The tire sealant and air has nowhere to go except down exhaust hole 47, along bore 44, and out of port 40 via nozzle 43 into hose 22 and ultimately into a tire via chuck 24.

Other tire sealing devices that employ containers of tire sealant typically will use pressurized containers. These are dangerous to keep in the trunk or hatch of an automobile since the temperature variations of these storage places can be extreme and can cause a pressurized container to rupture or explode. Pressurized containers are also more difficult and more expensive to ship. Some tire sealing devices employ non-pressurized containers of tire sealant. In every case known to the inventors, conventional non-pressurized containers of this type are pumped with air at one end of the container, and the tire sealant is forced out of the container at the opposite end of the container. Such a design requires at least two seals and a custom-made container.

By contrast, the instant invention's bottle has only one opening and requires only one seal. It is easier and less expensive to manufacture than the above-mentioned two-seal containers and can be a conventional bottle. Also, the central projection 45 makes a seal with the membranous seal 19 when the bottle is inserted into receptacle 14 in a manner similar to a hypodermic needle making a seal with the rubber seal on a via of medicine. Projection 45 seals with seal 19 even if bottle 16 is not fully seated into receptacle 14 (as long as the air compressor has not been activated).

When using device 10 as an ordinary tire inflating air compressor, cap 48 is screwed tightly into port 40. The air flow path begins at compressor 60, travels through hose 62, enters port 40 at intake nozzle 41, exits port 40 at nozzle at exhaust nozzle 43, travels along hose 22, and passes out of the system at chuck 24. In such a usage, one would like to be able to achieve as high an air pressure as possible to make the tire inflation process as speedy as possible. Typical portable air compressors can produce air pressures of up to 250 psi. However, when the device is used as a tire sealer, bottle 16 is placed in line with the air flow path, and air entering port 40 is forced into bottle 16, exits bottle 16, and then continues on out of port 40 via nozzle 43 as above. Thus, bottle 16 is subjected to the air pressure produced by the air compressor. Since bottle 16 is meant to be disposable, it is desirable to be able to manufacture a bottle that need not withstand such great air pressures.

As a result, device 10 may preferably be provided with a pressure relief valve 70 to reduce the amount of pressure in the air flow path. In the preferred embodiment, pressure gauge 20 is connected to air compressor 60 via hoses 64 and 68; a T-connector is disposed between hoses 64 and 68. Pressure relief valve 70 includes conventional components such as a valve body 71, ball 72, spring 73, plunger 74, and cap 75. When air compressor 60 is activated, the pressure generated in the air flow path can reach up to 250 psi. However, pressure relief valve 70 is configured to open if the pressure exceeds a much lower valve, e.g., 120 psi. In this way, the pressure in the air flow path is prevented from exceeding 120 psi, and a much less durable bottle need be utilized for bottle 16 since it only needs to be able withstand 120 psi of pressure as opposed to 250 psi. For example, it is contemplated that bottle 16 may advantageously be made from polyethylene terephthalate (PET) plastic or a similar polymer. To allow for a safety factor, the bottle may be designed to withstand pressures of between 140–190 psi.

Button 76 is provided so that a user may override pressure relief valve 70 when the device is being used as a conventional air compressor. That is, the user can depress button 76 to prevent the pressure relief valve 70 from opening when the air pressure exceeds the set point of the valve (e.g., 120 psi). Button 76 may be of the type that requires the user to press continually on the button in order to override pressure relief valve 70 as a safety feature. In this way, the button cannot be left in the depressed position inadvertently when one wishes to use the device as a tire sealer to thereby avoid the risk of rupturing bottle 16 when it is in place. However, it is also contemplated that a button may be provided which, once depressed, stays depressed until redepressed (and thus disengaged). Other concepts contemplated as within the scope of the invention are a button or pressure relief valve integral with receptacle 14 or port 40 which will automatically reduce the air pressure to the valve set point level when a bottle is screwed into port 40.

The tire sealant mentioned above is preferably delivered in single-use bottles which are disposable after being emptied. One tire sealant compound that may advantageously be used in connection with the above device is a compound made by Hydrosol, or another compound made by Airosol Systems, Inc. and described in U.S. Pat. No. 5,338,776 to Peelor et al., the teachings of which are incorporated by reference herein. The compound may include an acrylic resin dissolved in a suitable solvent. A typical bottle holds approximately 12 fluid ounces of sealant; of course, the amount of sealant in the bottle may be varied and still remain within the scope of the invention.

Figure 10:
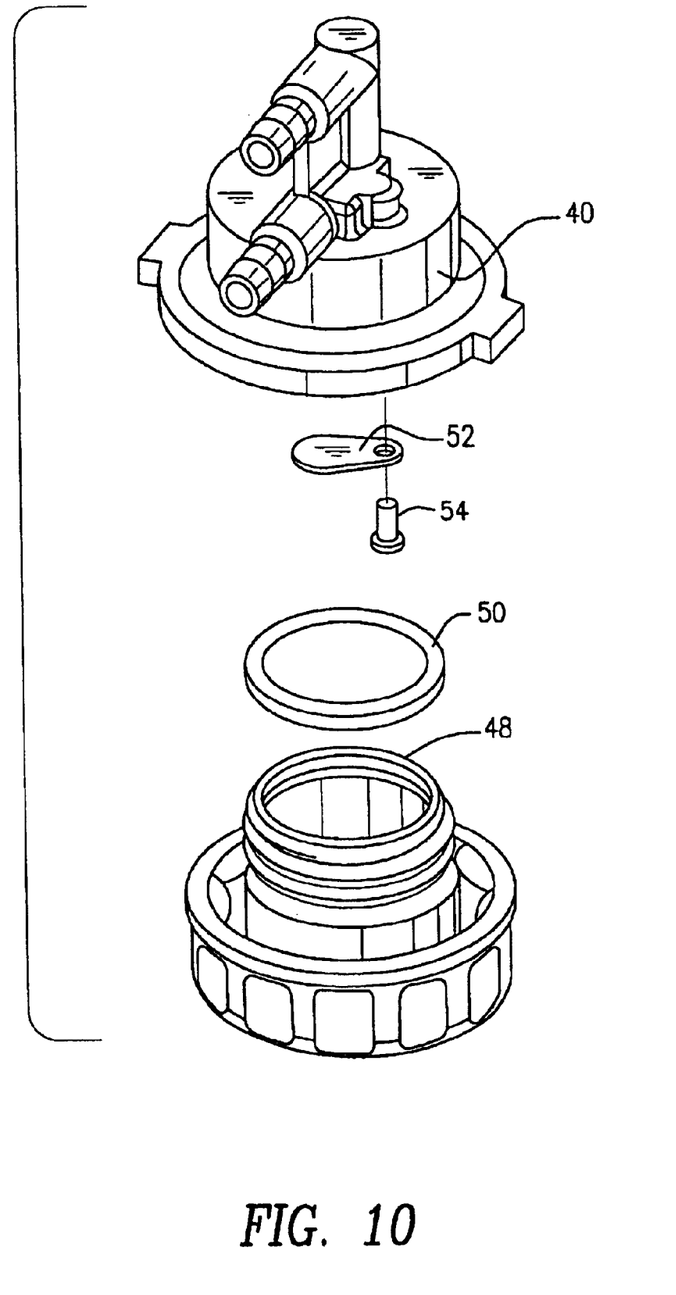
FIG. 10 is an exploded perspective view of an alternative receptacle port.

Variations in the above invention are contemplated. For example, the bottle receiving port is shown as a separate component that fits within a receptacle in the housing of the device. However, portions of or all of the port may be made integral with the housing. In addition, as shown in FIG. 10, a check valve 52 may be disposed in port 40 to prevent back flow of tire sealant into the air intake of the port. Pin 54 may secure check valve 52 in place over the appropriate hole. Also, the precise configuration of the air flow path described above is merely one possible configuration.

Figure 11:
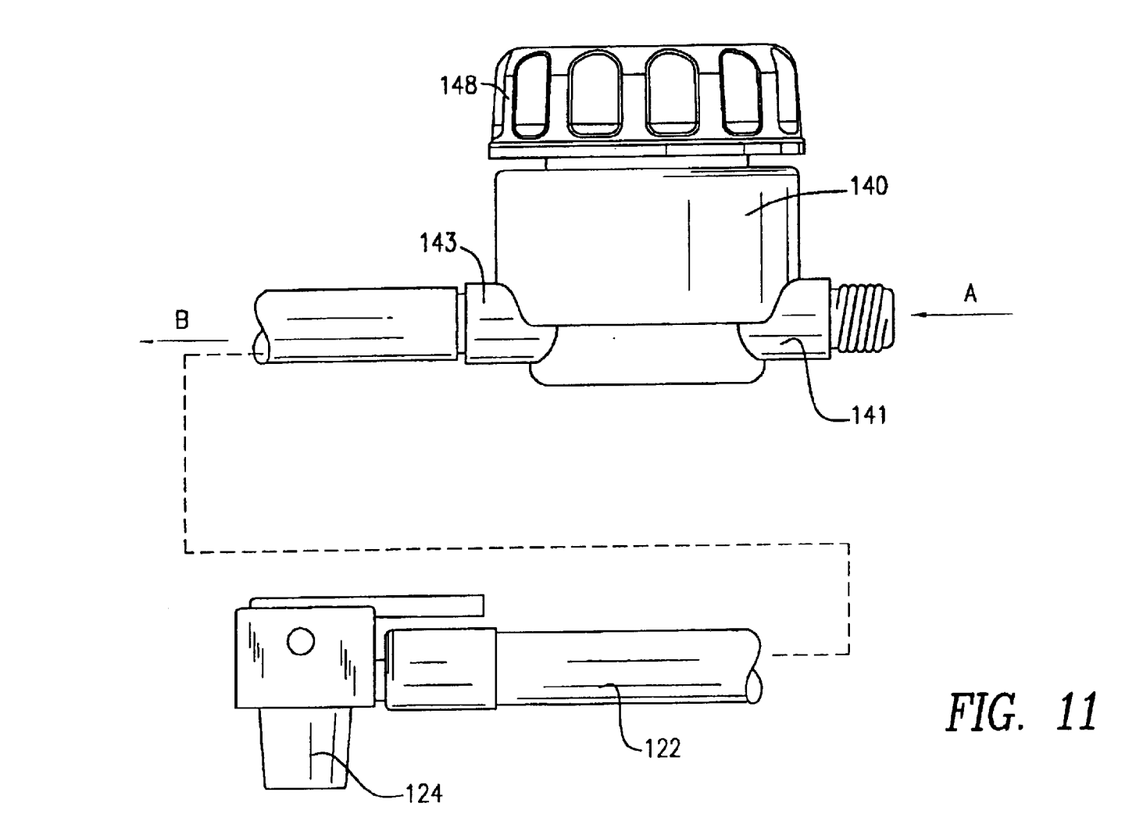
FIG. 11 is a side elevation view of another embodiment of the container-securing port of the invention.

Several different combinations of the various inventive elements are also contemplated, as shown in FIGS. 11–14. In FIG. 11, port 140 is substantially similar to port 40 described above. However, port 140 is not necessarily physically connected to the housing of the device. Port 140 includes intake nozzle 141 and exhaust nozzle 143. Intake nozzle 141 may be formed as a tire stem valve directly connectable to an air source such as an external air compressor, or it may be merely the same air flow path as described in FIG. 9 with the port being extendable from the housing yet still attached to the internal air compressor 60. As another alternative, port 140 may be provided as its own separate attachment with its own two hoses, attachable at one end to an air compressor and at the other to a tire, with a bottle being securable on top when cap 148 is removed. In any of these embodiments, port 140 may be provided with hose 122 and chuck 124 similar to hose 22 and chuck 24 described above.

Figure 12:
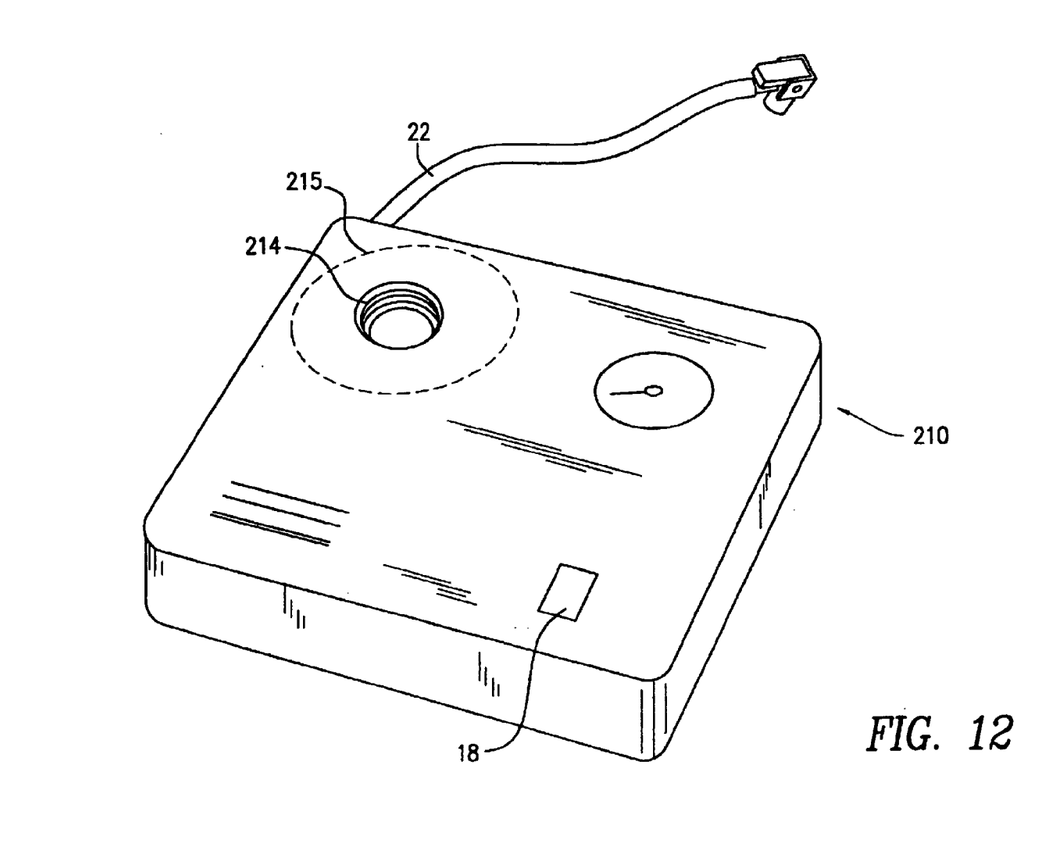
FIG. 12 is a schematic perspective view of an alternative embodiment of the overall inventive device having a reservoir.

Another configuration of the invention is described in FIG. 12. Here, device 210 includes a reservoir 215 having an orifice 214 exposed on the housing. In use, one removes the cap (not shown) from orifice 214, pours tire sealant into reservoir 215, replaces the cap on orifice 214, and activates switch 18 to turn on the air compressor. An intake forces air from the air compressor into the reservoir, and an exhaust receives air and tire sealant and directs them along hose 22 in the manner described above. If no tire sealant is contained within reservoir 215, device 210 will function as a conventional air compressor (as long as the cap is secure on orifice 214).

Figure 13:
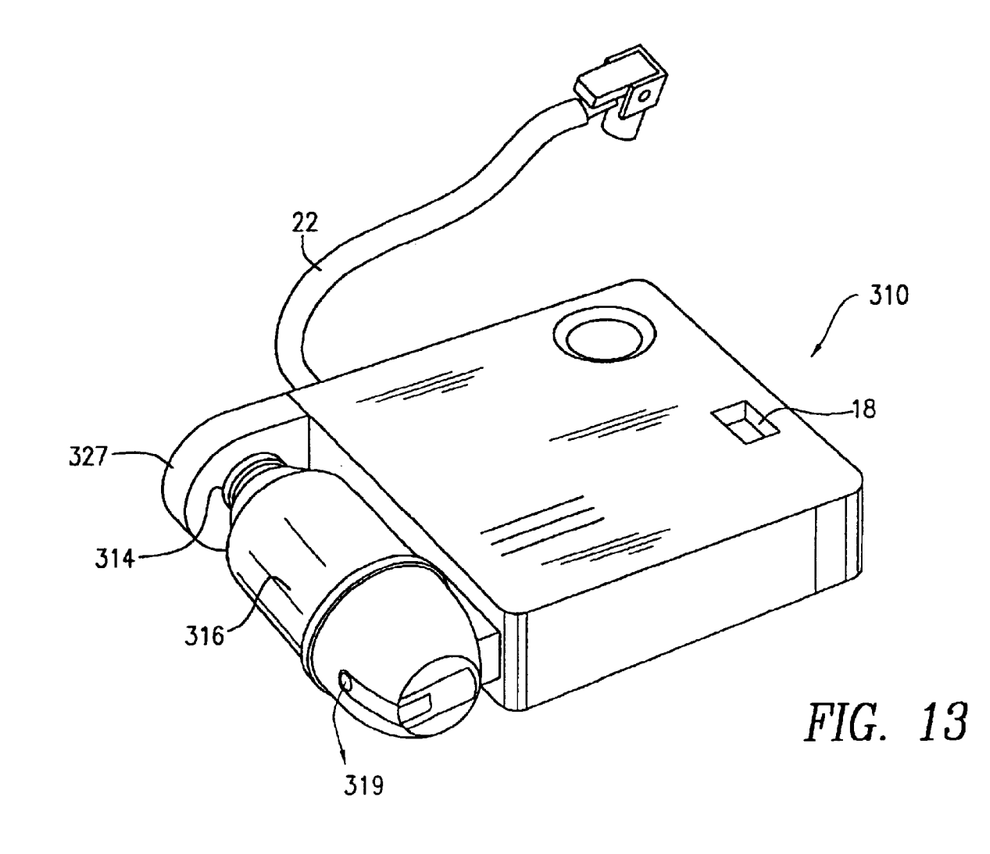
FIG. 13 is a schematic perspective view of an alternative embodiment of the overall inventive device having an aerosol or pressurized container.

A fourth configuration of the device is shown in FIG. 13. Device 310 is provided with a pressurized or aerosol container 316 instead of the unpressurized bottle 16 described above. In this embodiment, the receptacle 314 that receives container 316 is shown as part of flange 327; in the alternative, it is contemplated to be provided on the housing as with the other embodiments. Container 316 is provided with an activation switch/button/lever 319. Depressing the switch/button/lever allows the contents of the container to leave the container. In use, the air compressor is activated via on-off switch 18, and air is transmitted to the tire. When switch 319 is also activated, tire sealant escapes container 316 and is emitted into the air flow path and entrained with the air heading towards the tire.

Figures 14A, 14B:
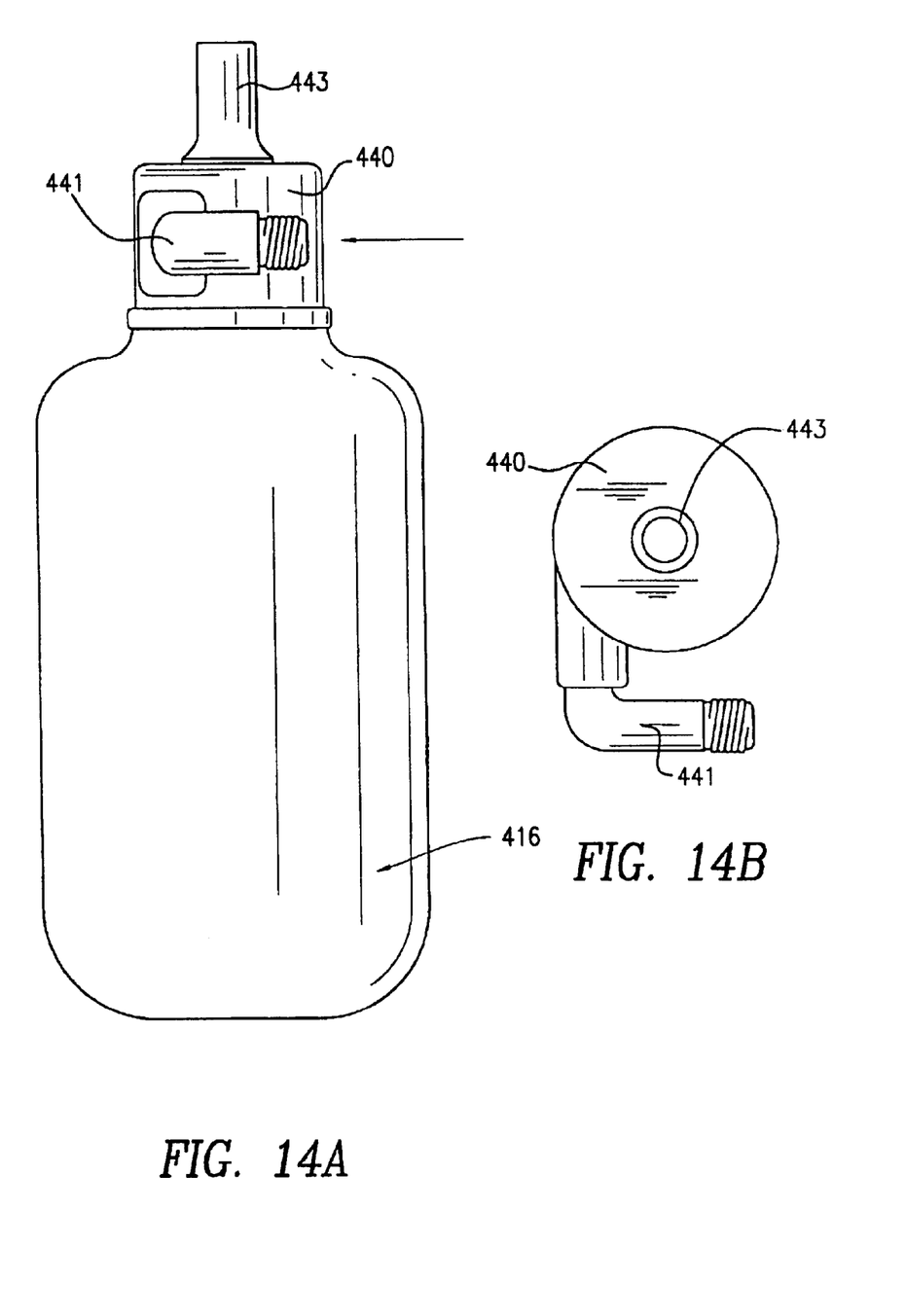
FIGS. 14A–B are side and top elevation view, respectively, of a disposable inventive tire repair container.

FIG. 14 describes another embodiment of the inventive container. Here, container 416 is provided with an integral port 440 having an intake 441 and an exhaust 443. Intake 441 is adapted to receive air from an external source. Exhaust 443 is connectable to a tire valve, either directly as a tire valve adaptor or via a hose similar to hose 22 and chuck 24.

Having described the invention, it should be understood that the scope of the invention is not limited to the above description but rather is defined by the claims appearing hereinbelow. Modifications to the above description that include that which is known in the art are well within the scope of the contemplated invention.

What is claimed is:

1. A tire repair device, comprising:
   a housing;
   an air compressor disposed within said housing;
   an air flow path from said air compressor adapted to be connected to a tire; and
   a receptacle formed in said housing in communication with said air flow path adapted to sealingly receive a container of tire sealant,
   wherein when said air compressor is activated and a container of tire sealant is received in said receptacle, air from said air compressor is forced into the container and pushes tire sealant out of the container, into said receptacle, into said air flow path, and into the tire.

2. A tire repair device according to claim 1, wherein said receptacle comprises:
   an intake that receives air from said air flow path upstream of said receptacle; and
   an exhaust that returns air to said air flow path downstream of said receptacle.

3. A tire repair device according to claim 2, wherein when a container of tire sealant is received in said receptacle, said intake directs air from said air flow path substantially into the container, and said exhaust receives air and tire sealant from the container and directs the air and tire sealant into said air flow path.

4. A tire repair device according to claim 3, further comprising a check valve disposed on said intake to prevent air and tire sealant form entering said intake.

5. A tire repair device according to claim 1, further comprising a piercing projection located in said receptacle adapted to pierce a seal on a container of tire sealant that is receivable in said receptacle.

6. A tire repair device according to claim 3, further comprising a piercing projection located in said receptacle adapted to pierce a seal on a container of tire sealant that is receivable in said receptacle.

7. A tire repair device according to claim 6, wherein said intake is located within said piercing projection and communicates with an outside of said piercing projection.

8. A tire repair device according to claim 1, wherein said air flow path terminates in a hose which terminates in a chuck adapted to sealingly engage with a conventional tire valve.

9. A tire repair device according to claim 8, further comprising a chuck holder formed on an exterior of said housing, having a substantially annular depression and a central projection shaped to sealingly fit inside said chuck when said chuck is in a storage configuration and not in use.

10. A tire repair device according to claim 2, wherein said intake and said exhaust are configured in said receptacle so that both said intake and said exhaust are opposite substantially the same opening of a container of tire sealant received in said receptacle.

11. An unpressurized container of tire sealant for use with the tire repair device of claim 1, comprising a plastic container housing and sufficient tire sealant within said container housing to repair a flat conventional automobile tire.

12. An unpressurized container of tire sealant according to claim 11, further comprising an opening in said housing and a membranous seal covering said opening.

13. An unpressurized container of tire sealant for use with the tire repair device of claim 2, comprising:
a plastic container housing and sufficient tire sealant within said container housing to repair a flat conventional automobile tire, wherein when said container is received in said receptacle, said opening substantially opposes said intake and said exhaust.

14. An unpressurized container of tire sealant for use with the tire repair device of claim 5, comprising a plastic container housing having an opening;
a membranous seal covering said opening; and
sufficient tire sealant within said housing to repair a flat conventional automobile tire,
wherein when said container is received in said receptacle, said piercing projection pierces said membranous seal on said container to allow air from said intake to enter said opening and air and said tire sealant to exit said opening and enter said exhaust.

15. An unpressurized container according to claim 11, wherein said container is disposable.

16. An unpressurized container according to claim 12, wherein said container is disposable.

17. An unpressurized container according to claim 13, wherein said container is disposable.

18. An unpressurized container according to claim 14, wherein said container is disposable.

19. An unpressurized container according to claim 12, said membranous seal comprising a thin sheet of at least one of paper, plastic, rubber, and metal foil.

20. An unpressurized container according to claim 14, said membranous seal comprising a thin sheet of at least one of paper, plastic, rubber, and metal foil.

21. A tire repair device according to claim 1, wherein when no container is received in said receptacle, said device functions like a conventional air compressor and can inflate tires.

22. A tire repair device according to claim 1, further comprising a pressure relief valve, disposed in said air flow path, to limit the air pressure to a predetermined level in said device when said air compressor is operating.

23. A tire repair device according to claim 22, wherein said predetermined level is below a burst pressure of a container of tire sealant to be used with said device.

24. A tire repair device according to claim 21, further comprising a pressure relief valve, disposed in said air flow path, to limit the air pressure to a predetermined level in said device when said air compressor is operating.

25. A tire repair device according to claim 24, further comprising a pressure relief override switch mechanically engageable with said pressure relief valve, wherein operation of said pressure relief override switch disables said pressure relief valve and allows the air pressure to exceed said predetermined level.

26. A tire repair device according to claim 1, further comprising a clamp projecting from a side of said housing, said clamp adapted to secure a bottle of tire sealant to said side of said housing.

27. A tire repair device, comprising:
a housing;
an air compressor disposed within said housing;
an air flow path from said air compressor adapted to be connected to a tire;
a receptacle formed in said housing in communication with said air flow path; and
a port disposed in said receptacle in communication with said air flow path adapted to sealingly receive a bottle of tire sealant,
wherein when said air compressor is activated and a bottle of tire sealant is received in said receptacle, air from said air compressor is forced into the bottle and pushes tire sealant out of the bottle, into said receptacle, into said air flow path, and into the tire.

28. A tire repair device according to claim 27, wherein said port comprises:
an intake that receives air from said air compressor upstream of said port; and
an exhaust that returns air to said air flow path downstream of said port.

29. A tire repair device according to claim 28, further comprising a hose connected to said exhaust, wherein air exiting said port enters said hose.

30. A tire repair device according to claim 29, wherein when a bottle of tire sealant is secured to said port, said intake directs air from said air flow path substantially into the bottle, and said exhaust receives air and tire sealant from the bottle and directs the air and tire sealant into said air flow path.

31. A tire repair device according to claim 29, said port comprising:
an intake nozzle in communication with said air compressor; and
an exhaust nozzle in communication with said hose.

32. A tire repair device according to claim 31, said port further comprising:
threads adapted to matingly engage threads on a bottle of tire sealant; and
a projection in communication with said intake nozzle adapted to pierce a seal of a bottle of tire sealant threaded into said port.

33. A tire repair device according to claim 32, wherein said intake and said exhaust are configured in said port so that both said intake and said exhaust are opposite substantially the same opening of a bottle of tire sealant threaded into said port.

34. An unpressurized bottle of tire sealant for use with the tire repair device of claim 27, comprising a plastic bottle housing and sufficient tire sealant within said bottle housing to repair a flat conventional automobile tire.

35. An unpressurized bottle of tire sealant according to claim 34, further comprising an opening in said bottle housing and a membranous seal covering said opening.

36. An unpressurized bottle of tire sealant for use with the tire repair device of claim 28, comprising:
a plastic bottle housing and sufficient tire sealant within said bottle housing to repair a flat conventional automobile tire, wherein when said bottle is secured to said port, said opening substantially opposes said intake and said exhaust.

37. An unpressurized bottle of tire sealant for use with the tire repair device of claim 32, comprising a plastic bottle housing having an opening;
a membranous seal covering said opening; and
sufficient tire sealant within said bottle housing to repair a flat conventional automobile tire,
wherein when said bottle is secured to said port, said projection pierces said membranous seal on said bottle to allow air from said intake to enter said opening and air and said tire sealant to exit said opening and enter said exhaust.

38. A tire repair device, comprising:
a port adapted to sealingly receive a bottle of tire sealant;
an intake that receives air from an air compressor upstream of said port;

an exhaust downstream of said port; and an air flow path from said exhaust adapted to be connected to a tire;

wherein when a bottle of tire sealant is secured to said port, said intake directs air from the air compressor substantially into the bottle, and said exhaust receives air and tire sealant from the bottle and directs the air and tire sealant into said air flow path and into the tire.

39. A tire repair device, comprising:

a housing;

an air compressor within said housing;

an air flow path from said air compressor adapted to be connected to a tire; and a port in communication with said air flow path adapted to sealingly receive a bottle of tire sealant, wherein when said air compressor is activated and a bottle of tire sealant is sealingly received in said port, air from said air compressor is forced into the bottle and pushes tire sealant out of the bottle, into said port, into said air flow path, and into the tire.

40. A tire repair device according to claim 39, wherein said port is seated in a receptacle formed in said housing.

41. A tire repair device according to claim 39, wherein said port is in communication with said air flow path via a hose and is extendable from said housing.

42. A tire repair device, comprising:

a housing;

an air compressor within said housing;

an air flow path from said air compressor adapted to be connected to a tire; and a reservoir formed in said housing in communication with said air flow path adapted to receive tire sealant, wherein when said air compressor is activated and tire sealant is received in said reservoir, air from said air compressor is forced into said reservoir and pushes tire sealant out of said reservoir, into said air flow path, and into the tire.

43. A tire repair device, comprising:

a housing;

an air compressor within said housing;

an air flow path from said air compressor adapted to be connected to a tire; and a receptacle formed in said housing in communication with said air flow path adapted to sealingly receive a container of tire sealant, wherein when said air compressor is activated and a container of tire sealant is received in said receptacle, tire sealant leaves the container and is entrained into said air flow path, and enters the tire.

44. A tire repair device according to claim 43, further comprising a pressurized container of tire sealant sealingly receivable with said receptacle, said pressurized container having an activation switch for selectively allowing the tire sealant to be expelled, wherein when said air compressor and said activation switch are activated, the tire sealant is expelled from said pressurized container and is entrained along with the air from said air compressor.

45. A disposable tire repair device, comprising:

a container of tire sealant;

a port sealingly secured to said container of tire sealant, said port including an intake that receives air from an air compressor upstream of said port, and an exhaust downstream of said port; and an air flow path from said exhaust adapted to be connected to a tire;

wherein the air compressor is activated, said intake directs air from the air compressor substantially into said container, and said exhaust receives air and tire sealant from said container and directs the air and tire sealant into said air flow path and into the tire.

46. A disposable tire repair device according to claim 45, wherein said air flow path comprises a hose attachable to a tire valve.

47. A disposable tire repair device according to claim 45, wherein said air flow path comprises a tire valve adaptor stem.

* * * * *